June 20, 1967  D. P. HAND  3,326,310
DRIVE ASSEMBLY FOR CARRIER VEHICLE
Filed Feb. 19, 1965  3 Sheets-Sheet 3
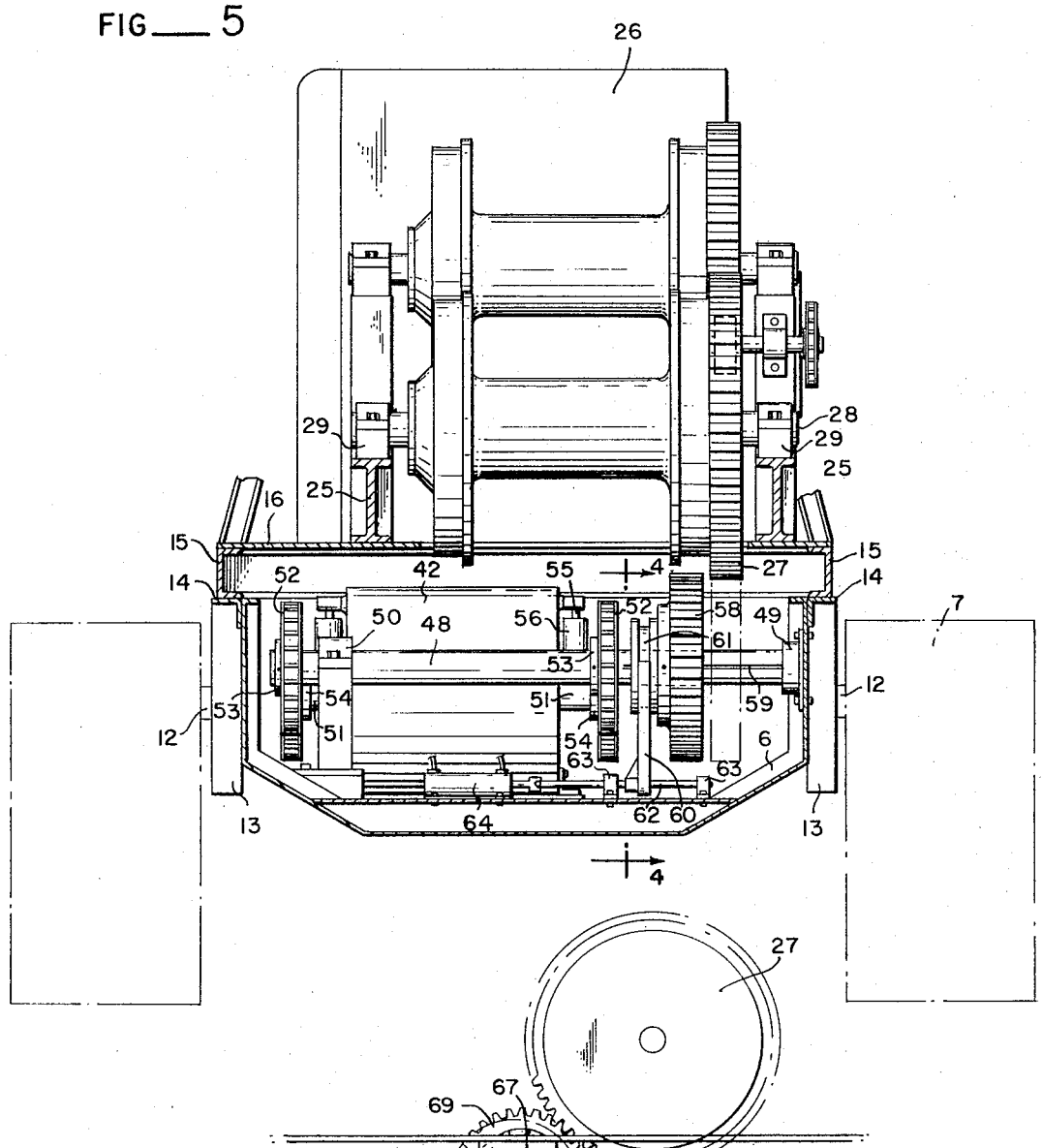
FIG—5
FIG—6
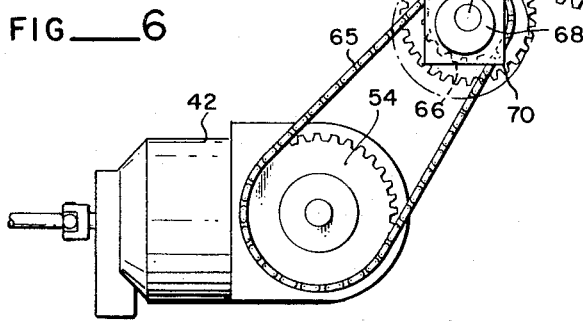
DOUGLAS P. HAND
INVENTOR.
BY
ATTORNEYS

United States Patent Office 3,326,310
Patented June 20, 1967

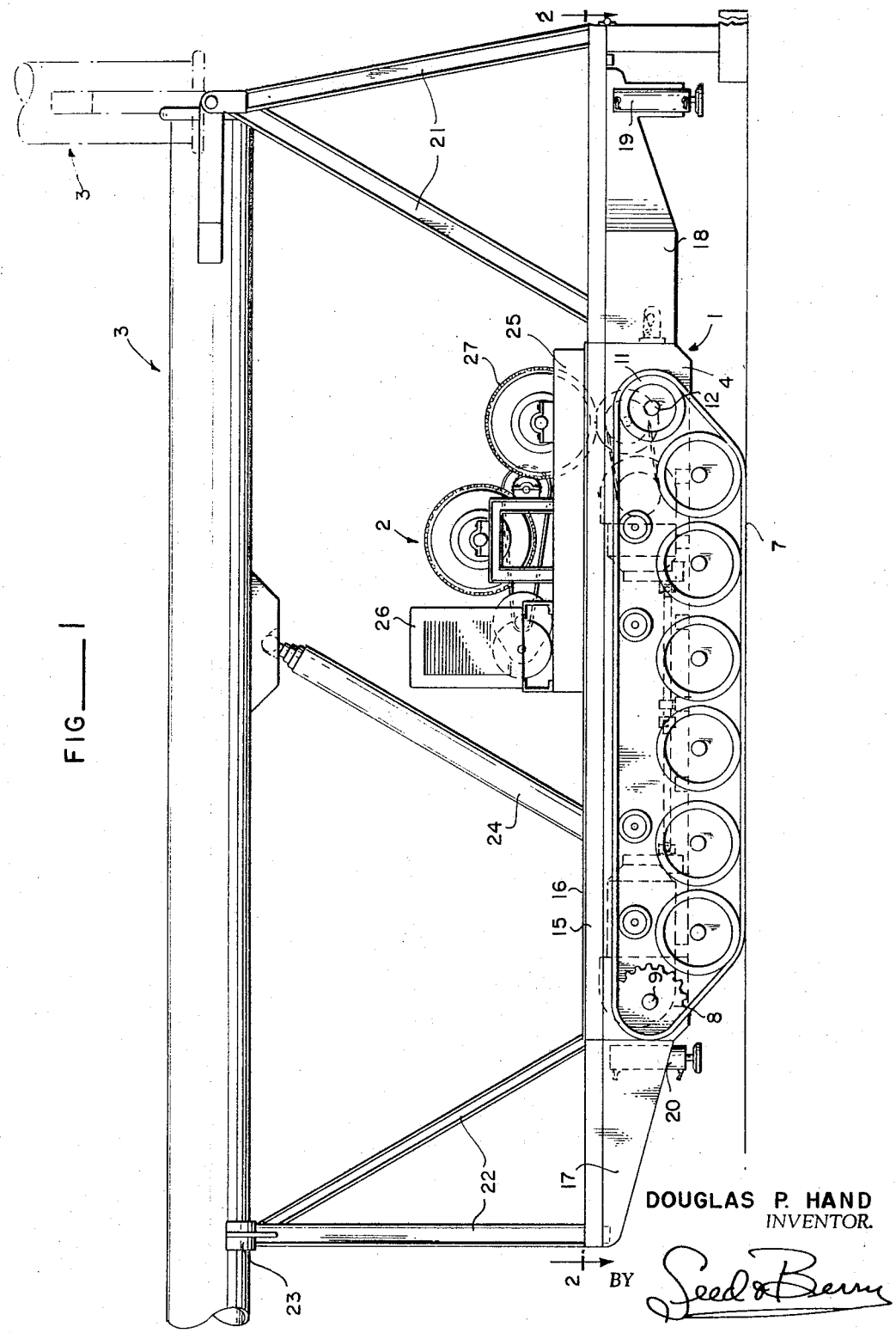

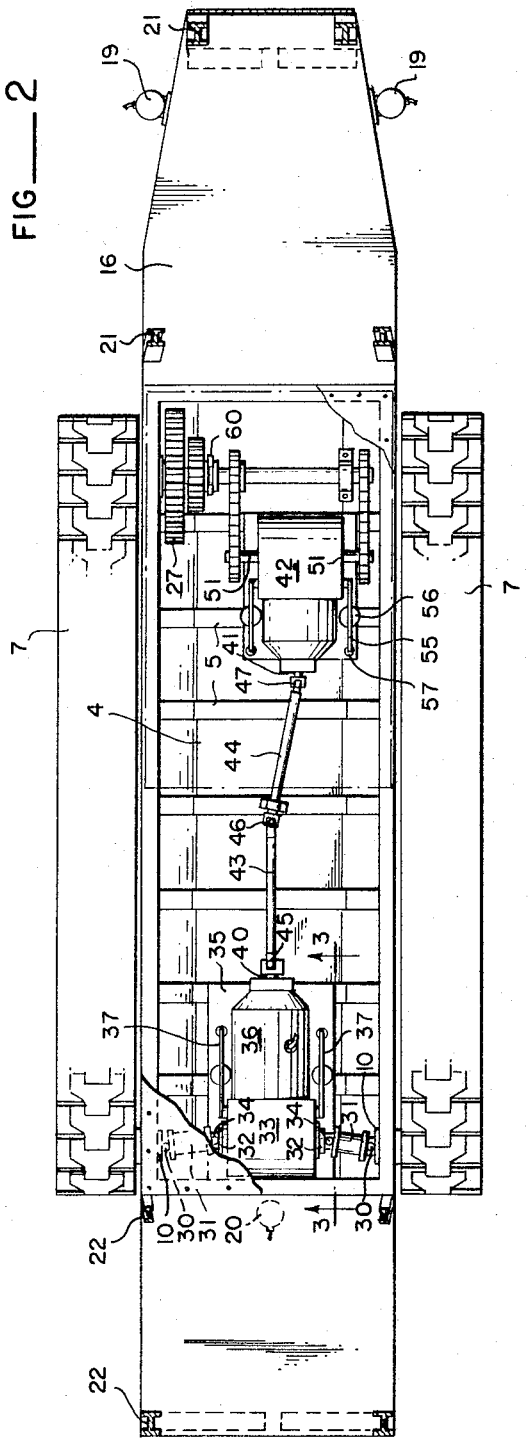

3,326,310
DRIVE ASSEMBLY FOR CARRIER VEHICLE
Douglas P. Hand, 1258 W. Pender, Vancouver,
British Columbia, Canada
Filed Feb. 19, 1965, Ser. No. 433,937
7 Claims. (Cl. 180—6.2)

The present invention relates in general to carrier vehicles for mounting and transporting work production units wherein such units are mounted on a deck or other superstructure on top of the carrier or in the hull. As used throughout this specification and appended claims, the term "production unit" will be understood to refer to any work production unit having a prime mover, such as a yarder, air compressor, power winch, etc. More specifically, the present invention relates to a novel drive arrangement for a carrier vehicle whereby the prime mover of the production unit carried on top of the vehicle or in the hull is used as the power source for driving the vehicle during transport, thus eliminating the need for a separate power source or prime mover for the vehicle.

In many circumstances such as heavy construction or logging operations where it is necessary to maneuver heavy production units, such as yarders and compressors, over extremely rough terrain, it is the practice to mount such units either permanently or temporarily on a wheeled or tracked vehicle which is easily movable. In the past it has been customary to either utilize a trailer as the carrier vehicle with the necessity of a tractor or the like for towing the trailer, or to utilize a vehicle having a completely separate power source or prime mover from the production unit carrier by the vehicle. Such arrangements are expensive and inefficient since the prime mover of the production unit is not being utilized during transport and the prime mover of the vehicle is not being utilized during periods when the production unit is in use. The present invention seeks to reduce the cost of such units and to provide a much improved drive connection for the carrier vehicle by utilizing a novel drive connection for taking power from the prime mover of the production unit to drive the vehicle. Other advantages which result from the present invention lie in the compactness and simplicity with which the carrier vehicle may be constructed and the provision of an auxiliary braking system for the vehicle which may be a part of the drive connection.

The primary object of the present invention is, therefore, to provide an improved drive arrangement for a carrier vehicle for connecting the prime mover of a production unit to drive the vehicle to transport the unit.

Another object of the present invention is to provide a drive arrangement for a carrier vehicle of the character described incorporating an auxiliary braking system for the vehicle.

Another object of the present invention is to provide a low-cost carrier vehicle which is simplified and compact in construction.

Yet another object of the present invention is to provide a drive arrangement of the character described incorporating a controlled differential for steering the tracks or wheels of the carrier vehicle for increased maneuverability on rough or uneven terrain.

Other more particular objects and advantages of the invention will, with the foregoing, appear and be understood in the course of the following description and claims, the invention consisting in the novel construction and in the adaptation and combination of parts hereinafter described and claimed. Reference is made now to the accompanying drawings in which:

FIGURE 1 is a side elevation of the carrier vehicle with a production unit mounted thereon;
FIG. 2 is a plan view taken along lines 2—2 of FIG. 1 with certain portions being broken away to show the drive arrangement;
FIG. 3 is a view taken along lines 3—3 of FIG. 2;
FIG. 4 is a view taken along lines 4—4 of FIG. 5;
FIG. 5 is a partially sectioned end elevation of the unit; and
FIG. 6 is an elevational view showing a modified form of power connection between the drive arrangement and the power source of the production unit.

Since one of the most important applications of the present invention is in the logging industry, the embodiment of the invention described herein deals with a carrier vehicle for a spar tower and logging yarder. Although the yarder is the specific production unit described herein, it will be understood that any such production unit may be mounted on the carrier vehicle and the specific yarder and spar tower are shown for purposes of illustration only.

Referring now to FIG. 1, a tracked carrier vehicle is illustrated generally at 1, a conventional yarder unit is indicated at 2 and a portable metal spar tower is indicated at 3.

The carrier vehicle comprises a shell or body 4 which, in the present case, is a hollow metal structure having any desired means of reinforcing such as the cross-ribs 5 and the side braces 6. In practice, the carrier body 4 is usually a welded structure with the ribs 5 and braces 6 being welded in position to give the desired strength and rigidity to the body. It will be understood that any desired configuration of body 4 may be utilized which is sufficient for housing and supporting the drive components presently to be described.

The vehicle 1 includes conventional endless tracks 7 which are designed to be powered through a drive sprocket 8 carried by the stub shafts 9 connected to suitable final drive or gear reduction units 10 mounted in the front end of the body 4 as shown in FIG. 2. Each of the tracks 7 extends about guide rollers 11 mounted on idler shafts 12 carried at the rear end of the body 4 in the bearing housings 13 as shown in FIG. 5. The structure thus far described is conventional in vehicles of the type under consideration as will be understood by those skilled in the art, and it will be understood that many variations and modifications of such structure are possible and the details of such modifications form no part of the present invention. Although the present vehicle is illustrated as a tracked vehicle, it will be understood that a conventional four-wheeled vehicle would serve the purpose equally well, as will be appreciated as this specification progresses.

The carrier body 4 may be provided with longitudinal support members 14 as seen in FIG. 5, in the form of angle irons or the like welded or otherwise affixed to the respective top edges of the sides of the body to provide a support surface for attaching the longitudinally extending deck beams 15 as shown in FIGS. 1 and 5. The deck beams 15 are fixed by any suitable means to the support members 14 and serve to mount a flat deck 16 which in turn supports the yarder or other production unit 2 as well as any other accessory units which may be needed. It will be appreciated that suitable cross beams or the like may be added between the beams 15 to give sufficient load support. As illustrated in FIGS. 1 and 2, the deck beams 15 may be extended beyond each end of the carrier body 4 in the present instance to provide the necessary support for the spar tower 3. The extensions of the deck beams 15 may be braced by means such as the side plates 17 at the front of the vehicle and the plates 18 at the rear thereof.

The rear brace plates 18 may be utilized to mount a set of hydraulic jacks or cylinders 19 and a similar hydraulic jack 20 may be carried on any convenient location on the front end of the vehicle as shown in FIGS. 1 and 2. The jacks 19 and 20 may be operated from the conventional hydraulic control system for the production unit 2, not shown, or may be any equivalent jack structure so as to provide means for increasing the stability of the vehicle and the units supported thereon when the carrier has been located in position.

The spar tower 3 is mounted on the rear extension of the deck and deck beams by the support beams 21 and will normally be pivoted to the beams 21 in a suitable fashion so as to allow the tower 3 to be raised to the vertical position during use and pivoted to the horizontal position shown in FIG. 1 for transport. The forward extension of the deck beams is utilized for mounting the braces 22 which carry the cradle 23 for supporting the tower 3 in the horizontal position. In addition, an intermediate ram 24 may be mounted on the deck 16 to assist in the raising of the tower as will be understood by those skilled in the art.

The yarder 2 is conventional in all respects and may be any one of a multitude of types of yarder units commercially available and well-known in the art. The yarder 2 is supported as a unit on any type of support base such as the longitudinal beams 25. For the purpose of this specification, it is only necessary to point out that the yarder unit is equipped with a prime mover 26 which is usually an internal combustion engine and which serves to drive a constantly rotating bull gear 27. The bull gear 27 may be connected by any suitable gear train or other drive connection directly with the engine or prime mover 26. The bull gear 27 may be one of a plurality of such gears depending upon the particular yarder used and the winding drums of the yarder are then driven from the rotating bull gear or gears with conventional clutches and braking mechanism being provided to control rotation of the drums from the gears. It is also the practice to provide some form of drive transmission unit between the prime mover 26 and the bull gear 27 to enable the gear to be stopped without stopping the engine. As shown in FIG. 5, the bull gear 27 is mounted on a rotatable shaft 28 carried by suitable bearing blocks 29 supported by the beams 25. The bull gear 27 is a large diameter gear which extends through the deck 16 so that its lower periphery actually rotates within the hollow body or shell 4 of the vehicle. Further details of the yarder may be varied as desired and form no part of the present invention. In the event that any other production unit such as a compressor or the like is to be mounted on the deck 16 and to be utilized as the power source for connection to the drive arrangement to be described, the only essential feature would be an arrangement for the transfer of the rotation of a constantly driven element into the body of the vehicle.

Turning now to the details of the drive arrangement for transferring power from the production unit to the drive sprockets 8 for driving the vehicle, and referring especially to FIG. 2, it will be noted that each of the final drive or gear reduction units 10 is connected by means of a universal joint 30 to the connectors 31 which are in turn connected to the output shaft 32 of a conventional controlled differential unit 33 by means of the universals 34. The controlled differential 33, along with other items to be described, may be conveniently mounted on a platform 35 carried in the bottom of the front end of the body portion 4. The controlled differential 33 may be made a part of a unitary assembly which includes a hydraulic planetary transmission unit 36 the output shaft of which is connected directly to the input shaft of the differential 33, not shown. The transmission and differential may be constructed as a unit with the unit being supported by the platform 35 as shown in FIG. 2. Any convenient source of hydraulic fluid pressure from the production unit may be utilized to pressurize the transmission 36 and to control the speed of the output shaft of the transmission. Any conventional fluid transmission unit, capable of being connected to the differential and capable of controlling the speed of the input shaft of the differential may be used. In addition, the differential 33 includes means for selectively braking either or both of the output shafts 32 which braking means includes identical brake arms 37 on either side of the differential which are shown in detail in FIG. 3. The braking arms 37 are held in the brake-applied position by means of the tension springs 38 and hydraulic cylinders 39 are utilized to release the brake arms in opposition to the spring pressure. Thus the brakes for the output shafts 32 are constantly spring-applied and selectively hydraulically released by means of proper controls carried by the vehicle. With this braking arrangement, the tracks 7 may be locked to hold the vehicle stationary and the vehicle may be steered by releasing or applying the brakes to one or the other of the output shafts 32 or the brakes may be entirely released to effect forward travel of the vehicle.

The input shaft 40 of the transmission is connected to be driven by the output shaft 41 of a rear differential 42 located beneath the yarder in the body of the vehicle. Any suitable drive connecting means such as the transfer shafts 43 and 44 and the universals 45, 46 and 47 may be utilized to connect the output shaft 41 with the input shaft 40 as illustrated. The exact arrangement of transfer shafts and universals will depend in each case upon the positioning of the rear differential 42 which, in turn, will depend upon the location of the production unit 2 on the deck of the vehicle.

Looking now to FIG. 5, a transverse jack shaft 48 extends across the rear end of the body 4 and is journaled for rotation by a suitable bearing block 49 mounted on one side of the body beneath the bull gear 27 and a pillow block 50 located adjacent the opposite side of the body. The jack shaft 48 serves to drive the two input shafts 51 of the rear differential by means of drive chains 52 extending about the drive sprockets 53 on the jack shaft and sprockets 54 carried on the shafts 51.

From the arrangement described, it will be seen that the input shafts 51 of the rear differential 42 are driven in unison at the same constant speed upon rotation of the jack shaft 48. In order to provide an auxiliary braking system for the vehicle, the rear differential 42 may be provided with an identical braking arrangement such as described for the differential 33 and shown in FIG. 3 including the brake arms 55, hydraulic cylinders 56 and springs 57. As in the case of the forward differential, the rear differential brakes are applied with constant spring pressure and are released by energization of the hydraulic cylinders 56.

In order to selectively drive the jack shaft 48 from the bull gear 27, a drive gear 58 is slidably mounted on the jack shaft as shown in FIG. 5 and is drivingly connected thereto by means of the key or spline 59. The slidable mounting of the gear 58 enables the gear to be moved into mesh with the bull gear 27 when it is desired to transfer rotation of the bull gear through the described drive arrangement for the vehicle. In order to selectively engage the drive gear 58 with the bull gear, a yoke 60 engages a suitable annular groove 61 in the hub of the drive gear with the yoke being carried by a reciprocable actuating rod 62. The rod 62 may be mounted for reciprocation in the blocks 63 and is actuated by a hydraulic cylinder 64 which is controlled by the operator. Thus, when it is desired to drive the vehicle power train from the bull gear 27 of the production unit, the gear 58 is moved to the right, as viewed in FIG. 5, to the dotted line position in mesh with the bull gear 27.

Although one specific arrangement for connecting the drive gear 58 with the bull gear has been illustrated in FIGS. 4 and 5, it will be understood that many variations for engaging the drive gear may be utilized and one such variation is illustrated in FIG. 6. In this instance, the sprockets 54 of the differential 42 would be driven by chains 65 trained about suitable sprockets 66 fixed to a moveable shaft 67 mounted in eccentric bearings 68. In the modification shown in FIG. 6, it will be understood that each of the sprockets 54 is provided with a chain such as the chain 65 in order to drive the sprockets 54 through the shaft 67. The shaft 67 also is provided with a drive gear 69 designed to be moved into mesh with the bull gear 27. In order to move the shaft 67 and the gear 69 toward and away from the bull gear 27, eccentric bearings 68 on each end of the shaft 67 will be rotatably mounted in stationary bearing blocks 70 such as shown in FIG. 6 with any means, not shown, for rotating the eccentric bearings 68 to position the shaft 67. It will be understood by those skilled in the art that any means such as a hydraulic actuator, spanner wrench or the like may be used in turning the eccentric bearings 68 to selectively engage the drive gear 69 with the bull gear 27.

Turning now to the operation of the drive arrangement, and assuming that it is desired to relocate the yarder and spar tower shown as the production unit in the present illustration, the spar tower will be lowered to its horizontal position for transport and the winding drums will be declutched from the bull gears including the bull gear 27. With the prime mover 26 of the production until still running, the operator may disengage the drive to the bull gear in order to halt the gear to allow the drive gear 58, or the drive gear 69 in the modification in FIG. 6, to be meshed with the bull gear. If the arrangement in FIG. 5 is used, the cylinder 64 will be actuated to move the gear 58 to the right to the dotted line position shown by means of the reciprocating yoke 60 and the annular groove 61 in the gear hub. In the case of FIG. 6, any suitable means will be utilized to rotate the eccentric bearings 68 to the full line position shown in order to mesh the drive gear 69 with the bull gear 27. The operator will also release the brakes on the rear differential 42 by actuating the cylinders 56 which remain actuated so as to hold the brakes on the rear differential in a released condition during operation of the vehicle. It will also be noted that the controls for the transmission 36 will be set in the neutral position by the operator and that the brakes on the forward differential 36 are not released but are held in applied condition so as to hold the vehicle stationary. With these conditions being accomplished the operator may then clutch the bull gear 27 to the drive output of the motor or prime mover 26 of the production unit so that the bull gear operates constantly to provide a constant drive through the gear 58, jack shaft 48, rear differential 42 and transfer shafts 43 and 44 to the input shaft 40 of the transmission 36. When the operator desires to move the vehicle forward, the hydraulic cylinders 39 are actuated to release the brake arms 37 on the front differential 36. The transmission 36 will be controlled to effect the proper forward speed ratio and the drive from the transmission is then transferred through the front differential 33 and to the final drives 10 for driving the drive sprockets of the tracks 7. During operation of the vehicle, steering may be accomplished by controlling the application of the brake arms 37 on the front differential by means of the proper control of the hydraulic cylinders 39. This means of differential steering of a tracked or wheeled vehicle by independent control of the final drive is a common expedient and generally well-known in the art. The transmission 36 may be a conventional automatic planetary fluid transmission and the vehicle may be controlled in its forward travel by means of the brakes on the front differential 33. In the event of emergency, such as failure of the front differential braking system, the braking system of the rear differential 42 may be utilized by the operator to halt the vehicle.

From the foregoing description, it will be appreciated by those skilled in the art that the present drive arrangement provides advantages not available in the prior art and presents a drive arrangement which is readily adaptable to any size of vehicle or arrangement of the drive means of the production unit on the deck of the vehicle. For instance, it would be a simple matter to substitute any length of transfer shaft or shafts for the shafts 43 and 44 shown in FIG. 2 and the rear differential 42 may be located at any position along the length of the body of the vehicle and on either side or intermediate position transversely of the vehicle. Since the drive arrangement of the present invention is highly compact and simplified, the carrier vehicle may be of a relatively light weight construction and of any desired length which is an important factor in terms of maneuverability at construction sites or in the woods. The present invention also permits the entire unit to be constructed at a much lower cost since only one prime mover or engine is utilized in powering both the production unit and the carrier vehicle.

It will be readily apparent to those skilled in the art that the present invention provides novel and useful improvements in vehicle drive arrangements of the character described. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. In combination, a carrier vehicle, a production unit mounted on said vehicle and including a prime mover therefor, a controlled differential drive unit mounted in said vehicle and having independently controllable output shafts connected for driving, steering and braking control of the vehicle, and means to selectively drivingly connect said prime mover to said controlled differential, the prime mover of the production unit constituting the sole source of motive power for said vehicle.

2. In combination, a carrier vehicle having a plurality of ground engaging traction means, a production unit including a prime mover, means mounting said production unit on said vehicle, a controlled differential drive means mounted within said carrier vehicle and having an input shaft and independently controllable output drive shafts, means drivingly connecting the output drive shafts of said controlled differential to said traction means to independently control the traction means for steering and braking of the vehicle, and means to selectively drivingly connect said prime mover to the input shaft of said differential, whereby the traction means of said vehicle may be powered by the prime mover of said production unit and the vehicle braked and steered through said controlled differential.

3. The combination according to claim 2 wherein; said means for connecting the prime mover to the input shaft of the controlled differential includes a second differential drive unit, said second differential drive unit including braking means providing an auxiliary braking system for the vehicle.

4. In combination, a carrier vehicle including a vehicle body, a deck supported by said body, a production unit mounted on said deck and including a prime mover therefor, controlled differential drive means mounted in said body and having a longitudinally disposed input shaft, said differential means being drivingly connected to control the steering and movement of the vehicle, right angular drive transmission means connected to said input shaft, and means extending through said deck to selectively connect said prime mover to said right angular drive transmission means, whereby said vehicle may be powered by the prime mover of said production unit and steered and braked through said controlled differential drive means.

5. The combination according to claim 4 wherein, said right angular drive transmission comprises, a second differential drive unit, and independent braking means operatively associated with each of said differentials for controlling the movement of the vehicle.

6. In a carrier vehicle having a vehicle body, a deck supported by said body, a production unit mounted on said deck and including a prime mover therefor, a drive arrangement for driving said vehicle from said prime mover comprising; a first controlled differential drive unit having independently controlled output shafts and an input shaft disposed longitudinally within said body, means to drivingly connect the output shafts of said first differential to the final drive means of said vehicle to control the drive, steering and braking of the vehicle, a second controlled differential drive unit mounted in said body and including a single output shaft and two input shafts, the output shaft of said second differential extending longitudinally within said body and means including a selectively controlled power transmission unit for connecting the output shaft of the second differential to the input shaft of the first differential, and means extending through said deck to selectively drivingly connect said prime mover to the input shafts of said second differential.

7. In a carrier vehicle having a vehicle body, a deck supported by said body, a production unit mounted on said deck and including a prime mover, a drive arrangement for driving said vehicle from said prime mover comprising; a first differential drive unit having independently controlled output shafts and an input shaft disposed longitudinally within said body, means to drivingly connect the output shafts of said first differential to the final drive means of said vehicle to control the steering and movement of the vehicle, a second differential drive unit mounted in said body and including a single output shaft and two input shafts, the output shaft of said second differential extending longitudinally within said body and means including a selectively controlled power transmission unit for connecting the output shaft of the second differential to the input shaft of the first differential, and means extending through said deck to selectively connect said prime mover to the input shafts of said second differential, said last mentioned means including a constantly rotatable gear carried on said production unit and connected to be driven by said prime mover, movable gear means connected to rotate the input shafts of said second differential, and selectively operable actuator means to shift said movable gear means into mesh with said constantly rotatable gear.

References Cited
UNITED STATES PATENTS

| | | | |
|---|---|---|---|
| 1,548,664 | 8/1925 | Davis | 180—1 |
| 2,336,911 | 12/1943 | Zimmermann | 180—6.44 X |
| 2,522,068 | 9/1950 | Stallard | 180—1 |
| 2,690,230 | 9/1954 | Budesky | 305—35 |
| 2,698,667 | 1/1955 | Kropp | 180—6.7 X |

FOREIGN PATENTS 401,945  11/1933  Great Britain.

BENJAMIN HERSH, *Primary Examiner.*

J. A. PEKAR, *Assistant Examiner.*